United States Patent [19]

Ziemek

[11] Patent Number: 5,249,731
[45] Date of Patent: Oct. 5, 1993

[54] PROCESS FOR PRODUCING ALUMINUM COATED METALLIC MATERIAL

[75] Inventor: Gerhard Ziemek, Langenhagen, Fed. Rep. of Germany

[73] Assignee: Kabelmetal Electro GmbH, Fed. Rep. of Germany

[21] Appl. No.: 891,832

[22] Filed: Jun. 1, 1992

[30] Foreign Application Priority Data

Jun. 1, 1991 [DE] Fed. Rep. of Germany ....... 4118004

[51] Int. Cl.$^5$ ............................................ B23K 31/02
[52] U.S. Cl. ..................................... 228/148; 228/156
[58] Field of Search ................................. 228/148, 156

[56] References Cited

U.S. PATENT DOCUMENTS

| Re. 28,526 | 8/1975 | Ziemek ........................... 228/156 X |
| 3,449,821 | 6/1969 | Vansteenkiste .................. 228/156 X |
| 3,854,193 | 12/1974 | Yamaguchi et al. ............ 228/148 X |
| 4,759,486 | 7/1988 | Malone et al. ..................... 228/148 |
| 5,129,572 | 7/1992 | Keilberth et al. ............. 228/156 X |

Primary Examiner—Kenneth J. Ramsey
Attorney, Agent, or Firm—Ware, Fressola, Van Der Sluys & Adolphson

[57] ABSTRACT

A process for producing an aluminum coated metallic material comprises drawing an aluminum band having a significantly larger inside diameter than cross sectional diameter of the material concurrently with the material so as to form an open seam tube around the elongated metallic material. The seam of the open tube is welded so as to close the seam. An atmosphere or protective gas or reducing gas is maintained in an annular gap between the elongated metallic material and the aluminum tube. The diameter of the aluminum tube is drawn so as to reduce it by at least 20%. It is then drawn down a second time so as to coat the elongated metallic material. Finally, the cross section of the aluminum coated metallic material is reduced by at least 10%.

16 Claims, 1 Drawing Sheet

PROCESS FOR PRODUCING ALUMINUM COATED METALLIC MATERIAL

BACKGROUND OF THE INVENTION

1. Field of Invention

The invention relates to a process for producing aluminum-coated metallic material.

2. Description of the Prior Art

A known process for coating steel wire with aluminum, for example, comprises drawing a cleaned steel wire, which is coated with a flow medium, through an aluminum bath. This process creates brittle intermetallic compounds in the steel-aluminum interface, which sharply limit the use of such wire. Furthermore, the resulting coating is very thin.

Another known process by which steel wire is coated with aluminum is an extrusion process which is not very feasible because it is only possible to bond metals at very low production speeds.

A process for plating steel wire with aluminum is taught in U.S. Pat. No. 3,167,857, wherein a lengthwise moving aluminum band is continuously formed around a steel wire, and is bonded to it by a pair of pressure rollers. The steel wire is coated with zinc, because it is easier to subject zinc to a diffusion bond with aluminum, than steel. In addition, the steel wire is heated to between 200° and 300° C. The aluminum band is brush-polished to remove any oxide film. This process is not suited for continuous operation, since sustained brushing is not possible, because the brushes wear out and add to the abraded material. Also, because aluminum has a high affinity for oxygen, the exposed aluminum metal surface could oxidize suddenly, which may result in brittle intermetallic compounds in the steel-aluminum interface.

A similar process is taught by German Patent Document No. DE-AS 1,452,437, whereby the aluminum band is brushed or sandblasted. This process is not very feasible either, for the same reasons as described above.

The 'alumoweld' process for producing aluminum coated steel wire is a known process by which a steel wire is covered with aluminum powder which is thereafter ignited. The ignition of the aluminum powder melts the aluminum, which is then deposited as a film on the steel wire. Unfortunately, the disadvantage of this process is that it is relatively costly, and thus leads to correspondingly high prices for aluminum coated wire.

SUMMARY OF THE INVENTION

An object of the present provide a process whereby an elongated metallic material such as a metallic wire, is covered with an aluminum band, wherein the elongated metallic material and the aluminum layer coating form a metallic bond in subsequent operating steps, and wherein the metallic bond established between the elongated metallic material and the aluminum is strong.

The invention fulfills this object by providing a process wherein an aluminum band is formed around an elongated metallic material having an outside diameter so as to form an open a significantly larger inside diameter than the outside diameter of the elongated metallic material. The seam of the open tube is welded to form a closed tube. A protective gas or reducing gas atmosphere is maintained in the annular gap between the material and closed aluminum tube while the diameter of the aluminum tube is first reduced by at least 20%, and is thereafter drawn down onto the material so as to form an aluminum coated metallic material. The cross-section of the aluminum coated metallic material is further reduced by at least 10% to create a strong metallic bond between the aluminum coating and the elongated metallic material.

To achieve a flawless weld along the open seam, it is useful to heat the aluminum band, or at least the band edges, to evaporate fat or oil residues on the aluminum band. After heating, the seam of the open seam tube is welded with an arc welder in a protective gas atmosphere MG-welding). This process makes high production speeds possible.

Because the aluminum band is formed with a diameter significantly larger than the outside diameter of the metallic material and is welded into a tube, it is possible to reduce the tube diameter by at least 20% with known tools such as dies, turkey-heads or rollers. This mechanical reduction changes the dimensions of the inside surface of the aluminum tube and because only the plastic, ductile aluminum material is able to withstand such form changes, any nonductile layer of aluminum oxide existing on its inside surface will tear or flake in some places. The deformation of the aluminum oxide layer in the circumferential direction, and the expansion of the aluminum oxide layer in the longitudinal direction, break up the bond between the aluminum surface and the aluminum oxide layer. Areas of exposed aluminum and islands of aluminum oxide appear on the inside surface.

In conjunction with the deformation of the aluminum tube, a protective gas atmosphere, for example argon, helium or reducing gas, for example hydrogen, is maintained in the annular gap between the aluminum tube and the metallic material, to prevent an immediate "re-oxidation" of the exposed metal areas. These exposed aluminum areas are cold welded to the surface of the metallic material during the final reducing steps. The last step of the operation, reducing the cross section of the tube and metallic material by at least 10%, results in a strong bond of the aluminum and metallic surfaces, after which the coated material can be wound on a spool and be subjected to further handling without causing any separation between the aluminum and metallic material or damage to the aluminum layer due to bending.

In addition to the exposed surface on the inside surface of the aluminum tube, an exposed metal surface is required on the metallic material. The metallic material, which is preferably a copper, copper-alloy or steel wire, is cleaned prior to coating. Peeling, brushing or sandblasting are cleaning processes which have been found to be suitable. Brushing or sandblasting roughens the wire surface and provides additional mechanical bonding during the covering operation.

The heating of the aluminum tube to remove oils from its surface for better welding also has the advantage of making the aluminum oxide layer become more brittle, since the heat removes water from the aluminum oxide. The embrittlement of the oxide layer makes the oxide layer flake more easily during the diameter reduction processes. A laser can be used if only the band edges are to be heated.

When reducing the diameter of the aluminum tube, it is important to do this with enough power so that the reduction of the diameter and the resulting expansion of the tube break up the oxide layer adhering to the inner wall of the aluminum tube. The oxide layer should be removed from at least 40% of the inside surface of the aluminum tube, to provide sufficient bonding of the wire to the aluminum cover through cold welding. The diameter reduction is performed in several sequential steps, with the aluminum tube held straight. Each diameter reducing step uses a deformation tool such as a die and a pulling device. During the last diameter reducing step, a drawing drum is used as a pulling device so as to furnish the higher pulling forces required for a final 10% cross section reduction of the aluminum covered metallic material.

The aluminum coated wire produced in this manner can be subjected to additional treatments, such as, additional cross section reductions and heat treatments. These additional treatments improve the aluminum-metallic material bond even further.

The present invention provides a process for the production of aluminum coated metallic materials, such as wires, having nearly unlimited length. A significant advantage of the present invention is that the wall thickness of the aluminum coating is completely uniform around the circumference of the elongated metallic material. Also, the metal bond between the coating and the elongated metallic material has sufficient strength for most applications of such wires.

DETAILED DESCRIPTION OF THE PRESENT INVENTION

Figure 1:
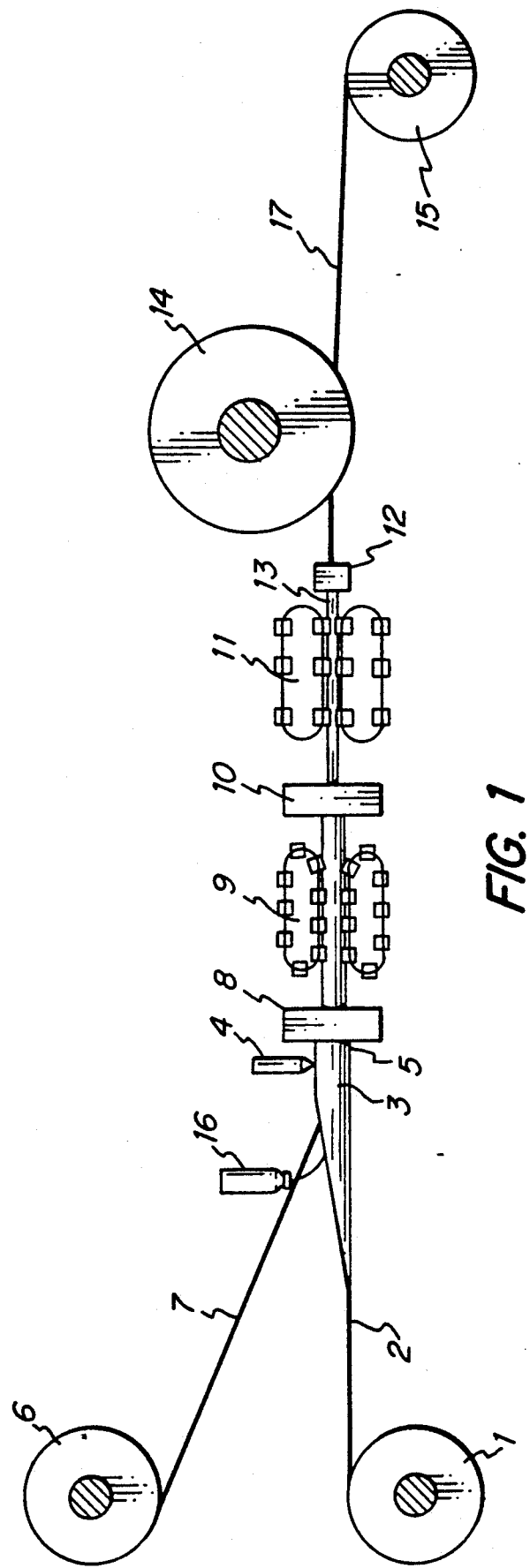
FIG. 1 is a schematic view of the process of the present invention.

Referring to FIG. 1, an aluminum band 2 is drawn from supply coil 1, and is formed into open seam tube 3 by a well known forming tool (not shown). The aluminum band is formed so as to fabricate the open seam tube to have a diameter which is significantly larger than an outer diameter of an elongated wire which is to be coated so that the tube diameter can be reduced by at least 20% with known tools such as dies, turkeyheads or rollers without reducing its wall thickness. The open seam tube is then welded with an arc welder 4 under a protective gas (TIG-welding) so as to close the open seam and form a closed seam tube 5. A metallic material 7, such as a copper, copper-alloy or steel wire, having a primarily circular cross-section is drawn from supply coil 6 and inserted into the open seam of tube 3. The closed seam aluminum tube 5 is passed through first die 8 so as to reduce its diameter by approximately 20-25% without reducing the wall thickness (hollow draw). The required drawing force is supplied by first draw collet 9. A second drawing step is provided by second die 10 and second draw collet 11 located behind it, and this step reduces the diameter of aluminum tube 5 further until it rests close to or on the surface of the wire 7 so as to form a coated wire 13. In some cases, it may be necessary to draw the aluminum tube 5 in more than two steps.

The cross section of coated wire 13 is reduced by approximately 15% in third die 12 to form a reduced coated wire 17. In this reducing step, both the diameter of the original wire 7, as well as the wall thickness of the surrounding aluminum tube 5, are reduced. Because significantly higher deformation forces are required for this step than for hollow drawing of the aluminum tube by itself, motorized wire drawing drum 14 is provided, and several turns of reduced coated wire 17 are wound around its circumference. From drawing drum 14, the wire is then wound on motorized take up coil 15.

When the aluminum tube 5 is reduced by the first die, both its diameter is reduced and its length is increased. Because a brittle layer of aluminum oxide which exists on the surface of the aluminum tube 5 cannot withstand this deformation, the oxide layer tears in some places, producing areas having a exposed, oxide-free surface. It is important that at least 40% of the oxide layer be removed from the inside surface of the aluminum tube so as to provide for sufficient bonding of the elongated wire to the aluminum tube 5 by cold welding with the wire 7 during the reducing step in the third die 12. Also, cold-welding continues during any subsequent drawing operation.

Because aluminum has a great affinity for oxygen and is immediately covered by a layer of oxide in air at normal temperature, a protective gas atmosphere of argon, helium or similar gas, or a reducing gas atmosphere, such as hydrogen, is maintained in the annular gap between the wire 7 and the aluminum tube 5 by gas bottle 16 so as to prevent oxidation from forming on any oxide-free surfaces. This atmosphere remains in the annular gap up to the point of third die 12 until the layer of aluminum is bonded to the wire 7 without any empty spaces. The protective/reducing gas atmosphere in the annular gap is slightly pressurized so as to prevent atmospheric oxygen from entering.

The coated wire 17 wound on supply coil 15 may undergo further operating steps, if desired. It may be useful to further reduce the cross section of the wire with a wire drawing machine. Also heat treatment (annealing) may be required to neutralize any coated wire micro-structure that is formed by the cold-forming process, or to improve the micro-structure of the wire (lead patenting). These additional procedures further improve the bond between the wire and the aluminum.

Also, several additional measures can be taken to achieve a better bond between the wire and the aluminum coating. For example, it is useful to clean the wire 7 prior to bonding by brushing or sandblasting to roughen the surface of wire 7 and achieve better adherence of the layers. Also, the aluminum band 2 may be preheated between supply coil 1 and the step to form the open seam tube so as to evaporate residues such as oil from the band surface, thereby increasing the quality of the weld seam, as well as making the oxide layer more brittle. Oxide layers on the aluminum surface are not pure $Al_2O_3$ (aluminum oxide) layers, but often contain water in the form of crystallization hydrates, which evaporate when the band is heated and make the oxide layers more brittle. Thus, a desirable brittleness of the oxide layer is usually achieved by this preheating step. A laser can be used if only the edges of aluminum band are to be heated.

The ratio of the length to the reduction of the tube as a measure of the ratio of oxide covered contact surface to oxide-free contact surface is:

$$\frac{l_2}{l_1} = \frac{F_o}{F_p}$$

where:
$l_2$ = length of the tube after drawing
$l_1$ = length of the tube before drawing
$F_p$ = platable (oxide-free) surface
$F_o$ = oxide covered surface A cold-welded bond between steel and aluminum, or copper and aluminum, is possible when $$\frac{F_p}{F_p + F_o} > 0.4 \text{ and preferably} > 0.6.$$

Thus, it can be seen from the foregoing specification and attached drawings that the present invention provides a unique means for continuously coating an elongated metallic material.

The invention as described above admirably achieves the objects of the invention; however, it will be appreciated that the departures can be made by those skilled in the art without departing from the spirit and scope of the invention, which is limited only by the following claims.

What is claimed is:

1. A process for producing an aluminum coated metallic material comprising the steps of:
    a) providing an elongated metallic material having an outside diameter;
    b) providing an aluminum band concurrently with said elongated metallic material;
    c) forming said band into an open seam tube around said elongated metallic material, said open seam tube having a significantly larger inside diameter than the outside diameter of said elongated metallic material so as to form an annular gap between the inside diameter of said open seam tube and the outside diameter of said elongated metallic material;
    d) maintaining a substantially oxygen free gas atmosphere in said annular gap between said elongated metallic material and said open seam tube;
    e) welding said open seam tube so as to form a closed seam tube having a first diameter;
    f) performing a first reducing step, wherein the first diameter of said closed seam tube is reduced by at least 20% to a second diameter;
    g) performing a second reducing step, wherein the second diameter of said closed seam tube is reduced so as to bring said closed seam tube into contact with said elongated metallic material to form an aluminum coated metallic material; and
    h) performing a third reducing step, wherein a cross-section of said aluminum coated metallic material is reduced by at least 10%.

2. A process according to claim 1, wherein said elongated metallic material is selected from the group consisting of copper, copper-alloy and steel wire.

3. A process according to claim 2, further including the step of cleaning said elongated material prior to the formation of said open seam tube according to step c.

4. A process according to claim 1, further including the step of heating said aluminum band so as to evaporate any residues thereon prior to step c.

5. A process according to claim 4, wherein the heating step is done with a laser beam.

6. A process according to claim 1, further including the step of heating said open seam tube so as to evaporate any residues thereon prior to step e.

7. A process according to claim 6, wherein the heating step is done with a laser beam.

8. A process according to claim 1, wherein said welding step is protective gas arc welding.

9. A process according to claim 1, wherein said atmosphere maintaining step includes providing a pressurized protective gas in said annular gap.

10. A process according to claim 1, wherein said closed seam tube has an oxide layer thereon and at least 40% of the oxide layer is removed from said closed seam tube by said reducing steps.

11. A process according to claim 1, further including the step of cleaning said elongated metallic material before step b.

12. A process according to claim 11, wherein said cleaning step is performed by means of sandblasting.

13. A process according to claim 1, wherein said atmosphere maintaining step includes providing a gas selected from the group consisting of hydrogen, helium and argon.

14. A process according to claim 1, wherein said first reducing step is performed with said closed seam tube held straight.

15. A process according to claim 1, wherein said second reducing step is performed with said closed seam tube held straight.

16. A process according to claim 1, wherein said third reducing step is performed with said aluminum coated metallic material held straight.

* * * * *

UNITED STATES PATENT AND TRADEMARK OFFICE
CERTIFICATE OF CORRECTION

PATENT NO. : 5,249,731

DATED : October 5, 1993

INVENTOR(S) : Gerhard Ziemek

It is certified that error appears in the above-identified patent and that said Letters Patent is hereby corrected as shown below:

Column 1, line 61, before "a", --seam tube with-- should be inserted.

Column 2, line 11, "MG" should be --(TIG--.

Signed and Sealed this

Twenty-ninth Day of March, 1994

*Attest:*

BRUCE LEHMAN

*Attesting Officer*   *Commissioner of Patents and Trademarks*